United States Patent
Mittermaier

(10) Patent No.: US 9,929,589 B2
(45) Date of Patent: Mar. 27, 2018

(54) APPARATUS FOR STABILIZING SUPPLY TO A CONSUMER

(71) Applicant: Bayerische Motoren Werke Aktiengesellschaft, Munich (DE)

(72) Inventor: Thomas Mittermaier, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 84 days.

(21) Appl. No.: 14/848,866

(22) Filed: Sep. 9, 2015

(65) Prior Publication Data
US 2015/0381053 A1   Dec. 31, 2015

Related U.S. Application Data

(63) Continuation of application No. PCT/EP2014/054698, filed on Mar. 11, 2014.

(30) Foreign Application Priority Data

Mar. 12, 2013   (DE) .................. 10 2013 204 238

(51) Int. Cl.
*H02J 7/00* (2006.01)
*H02J 9/04* (2006.01)
(Continued)

(52) U.S. Cl.
CPC .............. *H02J 9/04* (2013.01); *H02J 7/0065* (2013.01); *H02J 7/345* (2013.01); *H02J 9/00* (2013.01); *H02J 2007/0067* (2013.01)

(58) Field of Classification Search
CPC .... H02M 3/1588; H02M 3/156; H02M 3/157; H02J 1/10; H02J 3/32; H02J 3/38;
(Continued)

(56) References Cited

U.S. PATENT DOCUMENTS

| 5,161,097 A | 11/1992 | Ikeda |
| 5,703,415 A | 12/1997 | Tanaka |

(Continued)

FOREIGN PATENT DOCUMENTS

| DE | 101 53 741 A1 | 5/2003 |
| DE | 103 22 875 A1 | 1/2004 |
| DE | 10 2010 029 788 A1 | 12/2011 |

OTHER PUBLICATIONS

International Search Report dated Jul. 4, 2014 (Three (3) pages).
(Continued)

*Primary Examiner* — Nguyen Tran
(74) *Attorney, Agent, or Firm* — Crowell & Moring LLP

(57) ABSTRACT

The invention relates to a device for stabilizing the supply to a consumer from a buffer store, wherein during normal operation the consumer is supplied from an energy store. The device, which includes a DC-to-DC converter, a plurality of controllable switching elements and a control unit, is configured to (i) supply the consumer during normal operation, while bypassing components having power losses, directly from the energy store when the input voltage is greater than a preset first limit voltage, (ii) supply the consumer via the DC-to-DC converter fed from the energy store when the input voltage is below the first preset limit voltage, wherein the DC-to-DC converter converts the input voltage into an operating voltage of the consumer, and (iii) feed the DC-to-DC converter from the buffer store when the input voltage is below a second preset limit voltage until a voltage of the buffer store reaches the second preset limit voltage.

10 Claims, 2 Drawing Sheets

(51) Int. Cl.
*H02J 9/00* (2006.01)
*H02J 7/34* (2006.01)

(58) Field of Classification Search
CPC .. H02J 7/0063; H02J 7/34; H02J 7/002; H02J 9/062; H02J 9/04
USPC ........ 323/271, 282–285; 307/43, 44, 46, 48, 307/49, 64–66, 71, 77, 80, 84–85
See application file for complete search history.

(56) References Cited

U.S. PATENT DOCUMENTS

| | | |
|---|---|---|
| 5,747,891 A | 5/1998 | Williams |
| 6,153,949 A * | 11/2000 | Soderhall .............. H02J 7/0065 307/125 |
| 7,236,893 B2 | 6/2007 | Gross et al. |
| 2004/0196004 A1 | 10/2004 | Sasaki |
| 2005/0088793 A1 | 4/2005 | Anderson et al. |
| 2006/0006850 A1 | 1/2006 | Inoue et al. |
| 2009/0261657 A1 * | 10/2009 | Chen ................ H01M 8/04537 307/80 |
| 2011/0163601 A1 * | 7/2011 | Li ........................ H02J 7/0068 307/48 |

OTHER PUBLICATIONS

German Search Report dated Oct. 2, 2013, with Statement of Relevancy (Six (6) pages).

* cited by examiner

| Nr. | Function | U1 | U3 | U2 | S1 | S2 | S3 | S4 | S5 |
|---|---|---|---|---|---|---|---|---|---|
| 1 | Output OFF, buffer store charging | 5..16V | 16V | 16V | 1 | 0 | 0 | 0 | 1 |
| 2 | Output ON without operation of the DC-to-DC converter, buffer store trickle charging | 10..16V | 16V | 16V | 1 | 0 | 1 | 0 | 1 |
| 3 | Output ON via DC-to-DC converter (Ugs2 <U1 <Ugs1) | 5..10V | 16V | 10..16V | 1 | 0 | 0 | 1 | 0 |
| 4 | Output ON via buffer store (U1 <Ugs2, U3> Ugs2) | 0..5V | 5..16V | 10..16V | 0 | 1 | 0 | 1 | 0 |
| 5 | Output OFF, safety shutdown | 0..5V | 5V | 0V | 0 | 0 | 0 | 0 | 0 |

Fig. 2

APPARATUS FOR STABILIZING SUPPLY TO A CONSUMER

CROSS REFERENCE TO RELATED APPLICATIONS

This application is a continuation of PCT International Application No. PCT/EP2014/054698, filed Mar. 11, 2014, which claims priority under 35 U.S.C. § 119 from German Patent Application No. 10 2013 204 238.8, filed Mar. 12, 2013, the entire disclosures of which are herein expressly incorporated by reference.

BACKGROUND AND SUMMARY OF THE INVENTION

The invention relates to a device for stabilizing the supply to a consumer, which during normal operation is supplied from an energy store from a buffer store. In particular, the device relates to stabilizing the supply to a consumer which is connected to a vehicle electrical system.

Stabilizing the supply of consumers, for example measurement instrumentation temporarily present in a vehicle, is effected by the provision of a buffer battery or a buffer capacitor as a buffer store. Due to the high capacity and the short-term achievability of high currents, both during energy withdrawal as well as charging, in most cases electrochemical capacitors in the form of so-called supercapacitors (also referred to as ultracap or supercap) are employed as a buffer store. By means of the buffer store is to be ensured that the consumer does not unexpectedly fail or exhibit undefined behavior during a drop in the voltage provided by the energy store below the minimum voltage needed by the consumer. The buffer store is usually dimensioned such that an even briefer operation of the consumer is made possible, so that this may bring itself into a defined state or be brought into a defined state. In this example directed towards motor vehicles, the energy store can be a vehicle battery, at the supply terminal of which the supplied voltage may fluctuate due to dynamic processes in the vehicle. In principle, however, this problem can occur in other applications. For the sake of simplicity, reference in this specification is made with respect an application in a vehicle, however this application is to be considered limiting.

In order to prevent that other components are also supplied by the buffer store during a drop below the necessary minimum voltage needed for the operation of the consumer, which would greatly reduce the time for stabilizing the supply of the consumer, a diode is provided between a node to which the consumer and the buffer supply are connected and the energy store or the other components. The presence of the diode entails that unwanted power dissipation (heat) is caused through the drop in voltage, which in principle should be avoided. Furthermore, the voltage swing that can be made available to the consumer via the buffer store is reduced by the voltage drop across the diode. Due to the necessary minimum voltage of the consumer, only a small operating range of the buffer store can therefore be used.

In order to provide the consumer a constantly high voltage independent of the voltage of the energy store, a DC-to-DC converter can be disposed between the aforementioned node and the energy store. In this way, the voltage provided by the energy store is (as a rule) transformed up (step-up), whereby the operating range of the buffer store can be increased. During operation, however, the DC-to-DC converter causes a constant power loss, which is given off as heat.

It is an object of the present invention to provide a structurally and/or functionally improved device for stabilizing the supply to a consumer, which during normal operation is supplied from an energy store, from a buffer store.

Proposed is a device for stabilizing the supply to a consumer, which during normal operation is supplied from an energy store, from a buffer store, which comprises a DC-to-DC converter, a plurality of controllable switching elements and a control unit for controlling the switching state of the plurality of controllable switching elements depending on an input voltage of the device.

The device is designed to supply the consumer during normal operation, while bypassing components having power losses, directly from the energy store when the input voltage is greater than a preset first limit voltage, wherein the first limit voltage is a minimum voltage of the consumer required for the supply of said consumer. This allows the consumer, if a stabilization of its supply is not necessary, to be operated with minimized losses in the voltage stabilizing device.

The device is further designed to supply the consumer via the DC-to-DC converter fed from the energy store when the input voltage sinks below the first preset limit voltage, wherein the DC-to-DC converter converts the input voltage into an operating voltage of the consumer. The DC-to-DC converter is activated only when the minimum voltage for the consumer can no longer be provided through the energy store. This is first fed from the energy store such that the buffer store for stabilizing the supply to the consumer need not yet be activated. This therefore makes it possible to push back temporally the activation of the buffer store.

The apparatus is further designed to feed the DC-to-DC converter from the buffer store when the input voltage sinks below a second preset limit voltage until a voltage of the buffer store reaches the second preset limit voltage, wherein the second preset limit voltage is a minimum voltage of the DC-to-DC converter for the operation thereof. The buffer store is thereby connected with the consumer by means of the device via the DC-to-DC converter. In this case, the connection is first made only when the voltage provided by the energy store is no longer high enough to operate the DC-to-DC converter.

The proposed device thus enables a later start of discharge of the buffer store, which allows a longer supply to the consumer. The buffer store can further be more deeply discharged in comparison with known solutions, which also enables a longer supply to the consumer. Due to the absence of a diode, the buffer store can additionally be charged to a higher voltage, which also brings an increased voltage swing and enables a yet longer supply to the consumer. Each measure creates individually as well as in combination a maximization of the buffer capacity of the buffer store.

As a result, the consumer operated with this device is optimally stabilized independent from fluctuations or failures of the energy store. There is no loss of power in normal operation. Furthermore, no critical consumer stress states may occur.

The device can comprise a controllable third switching element, via which the consumer can be connected directly to the energy store, whereby the consumer can be supplied during normal operation directly from the energy store, while bypassing components having power losses. The heat generated by the device is thereby minimal.

The device can comprise a fourth switching element which is interconnected between an output of the DC-to-DC converter and an output of the device, whereby the DC-to- DC converter can be connected to the consumer via the fourth switching element. If the fourth switching element is closed, the third switching element is then open, so that a direct connection between the consumer and the energy store is disconnected.

The device can comprise a controllable first switching element which is interconnected between an input of the DC-to-DC converter and an input of the device, wherein the DC-to-DC converter can be connected with the energy store via the first switching element, whereby the consumer can be supplied by means of the DC-to-DC converter fed by the energy store when the input voltage sinks below the first preset limit voltage.

The device can comprise a second switching element, which is interconnected between the input of the DC-to-DC converter and a connection to the buffer store, whereby the consumer can be supplied by means of the DC-to-DC converter fed by the buffer store when the input voltage sinks below the second preset limit voltage.

The device can be designed such that the first and the second switching elements do not have the same switching state in normal operation, wherein normal operation comprises all operating states with the exception of safety shut-off, in which all switching elements of the device are turned off. This means that if the first switching element is closed, the second switching element is open, and vice versa. This ensures that either only the energy store or the buffer store is connected to the input of the DC-to-DC converter. This can be ensured by means of appropriate control of the two switching elements or by means of a switch provided as hardware, so that the first and the second switching elements can only be displaced in the corresponding switching state with a control signal.

The device can include a controllable fifth switching element which is interconnected between the output of the DC-to-DC converter and the connection to the buffer store, whereby the buffer store can be charged. The fifth switching element can be closed at given intervals if the consumer is not supplied with power. The fifth switching element can be closed at given intervals if the consumer is not supplied with energy via the DC-to-DC converter, but rather directly from the energy store. The fifth switching element can be closed at given intervals if the consumer is supplied with power via the DC-to-DC converter. It is understood that when the buffer store is to be charged by the closing of the fifth switching element, the connection between the input of the DC-to-DC converter and the input of the device must also be closed, so that the DC-to-DC converter can be supplied with energy. In other words, this means that the first switching element must also be closed.

The control of the switching elements is performed by the control unit. This means that this must be supplied with voltage in order to perform this task. For this purpose, the control unit is supplied with voltage from the input of the device or from the buffer store. It is thus ensured that the control unit functions both on initial operation, when the buffer store is still empty, as well as until the end when the energy store and the buffer store are empty.

The control unit can be designed so as to detect the input voltage. The control unit can be designed so as to detect the output voltage of the DC-to-DC converter. The control unit can be designed so as to detect the voltage of the buffer store by measurement. Depending on at least one of these voltages, the control unit can be designed so as to determine the switching states (closed or open) of the switching elements, i.e. the first to the fifth switching element.

The buffer store can be an electrochemical capacitor, such as a supercapacitor or an ultracapacitor. These have a high energy density and the ability to quickly charge and discharge. The buffer store can be dimensioned such that it enables a supply to the consumer for about one minute after the start of discharge. In principle, the size of the buffer store is to be adapted respective to the application.

The buffer store can be a component of the device. The buffer memory can also be a component separate from the device.

The invention is explained in more detail in the drawings below with reference to an exemplary embodiment.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows a table which illustrates the various operating states of the device.

DETAILED DESCRIPTION OF THE DRAWINGS

Figure 1:
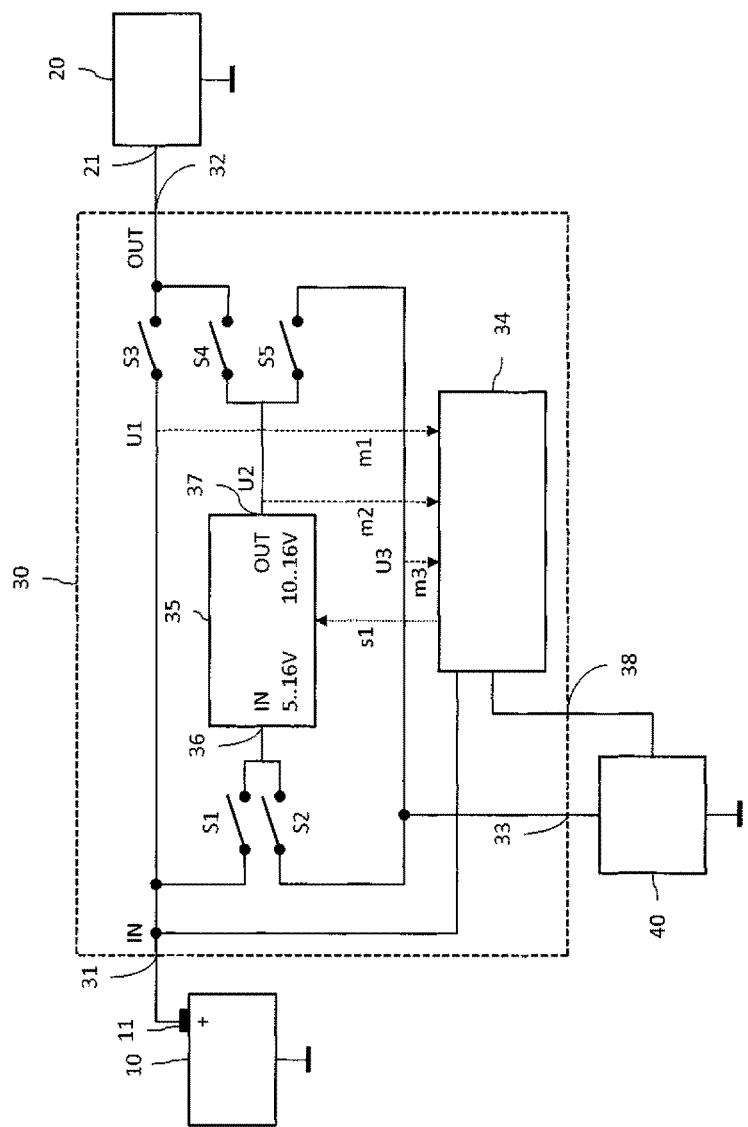
FIG. 1 shows a circuit arrangement which shows a device according to the invention for stabilizing the supply to a consumer, which during normal operation is supplied from an energy store, from a buffer store.

FIG. 1 shows a circuit arrangement of an energy store 10, a consumer 20 to be supplied and a device 30 for stabilizing the supply to the consumer. The device 30 for stabilizing the supply to the consumer will be hereinafter referred to as a voltage stabilization device. The consumer 20, for example temporarily used measurement instrumentation, is supplied in normal operation from the energy store 10, for example a vehicle battery. Normal operation is characterized in that the voltage applied to a battery terminal 11 of the energy store 10 is greater than a minimum voltage needed for the operation of the consumer 20.

The voltage stabilization device 30 has an input 31 and an output 32. The energy storage device 10 is connected with its battery terminal to the input 31 (IN). A supply input 21 of the consumer 20 is connected to the output 32 (OUT). A buffer store 40 is connected to an input 33 of the voltage stabilization device 30. The buffer store is connected with its other connection to a reference potential. The buffer store 40 is an electrochemical capacitor, i.e. a so-called supercapacitor (supercap) or ultracapacitor (ultracap). In the exemplary embodiment shown in FIG. 1, the buffer store 40 is not a component of the voltage stabilizing device 30. In an alternative design, the buffer store could also be a part of the voltage stabilization device 30.

The voltage stabilization device 30 comprises a control unit 34, a DC-to-DC converter 35 as well as five controllable switching elements S1 to S5. The switching elements S1, . . . , S5 are, for example, semiconductor switching elements, such as MOSFETs. Other types of switching elements can also be used. The respective switching state (conducting or blocking) of the switching elements S1, . . . , S5 is controlled by the control unit 34. In the following description of FIG. 2, a conductively switched switching element is indicated with "1," a blockingly switched switching element with "0." The control unit 34 further comprises a means for metrological detection of different voltages U1, U2, U3 within the voltage stabilization device. This means could also be provided in a separate measuring unit, whereby the result of the measurements would have to be transmitted to the control unit 34. The control unit 34 is optionally further connected (control signal s1) with the DC-to-DC converter 35 for the controlling thereof. The control unit 34 is supplied with voltage from the buffer store 40 via a supply input 38 of the voltage stabilizing device 30, which is connected to the buffer store 40. As a DC-to-DC converter (DC/DC converter) can be used, for example, a boost converter.

A first switching element S1 is interconnected between the input 31 of the voltage stabilization device 30 and an input 36 of the DC-to-DC converter 35. The first switching element S1 is thus connected with a connection with the supply terminal 11 of the energy store 10. A second switching element S2 is interconnected between the input 33 voltage stabilization device 30 and the input 36 of the DC-to-DC converter 35. The second switching element S2 is thus connected with a connection with the buffer store 40. A third switching element S3 is interconnected between the input 31 of the voltage stabilization device 30 and the output 32 of the voltage stabilization device 30. The third switching element S3 can thereby establish a direct connection, i.e. a connection without components having power losses, between the energy store 10 and the consumer 20. A fourth switching element S4 is interconnected between the output 37 of the DC-to-DC converter 35 and the output 32 of the voltage stabilization device 30, so that the DC-to-DC converter 35 can be connected with the consumer 20 via the fourth switching element S4. A fifth switching element S5 is interconnected between the output 37 of the DC-to-DC converter 35 and the input 33 of the voltage stabilization device 30, whereby the DC-to-DC converter can be connected with the buffer store 40.

The input voltage U1 of the voltage stabilization device 30 is detected by means of the control device 34, wherein the signal representing the voltage U1 is indicated with m1. The voltage U1 corresponds to the voltage at the input 31 of the voltage stabilization device 30 and thus the voltage applied to the supply terminal 11. Further, the output voltage U2 is detected at the output 37 of the DC-DC converter by the control device 34. The signal representing the voltage U2 is indicated with m2. Finally, the voltage U3 is detected by the control device 34, whereby the signal representing the voltage U3 is indicated with m3. The voltage U3 thus corresponds to the voltage of the buffer store 40.

At least the voltage U1 is processed via the control unit 34 for the control of the switching elements S1, . . . , S5, for the purpose of which a comparison with the preset limit voltages (i.e. threshold values which are stored in the control unit 34) takes place. A first limit voltage Ugs1 is defined through the minimum needed voltage for the operation of the consumer 20, plus a safety margin if necessary. The first limit voltage may be approximately 10 V, if it is assumed that the consumer 20 can be operated at a voltage between 9 and 16V. A second limit voltage Ugs2 is defined through the minimum needed voltage for the operation of the DC-to-DC converter, plus a safety margin if necessary. The second limit voltage Ugs2 is dependent on the realization of the DC-to-DC converter 35, and may be approximately 5 V. In the exemplary embodiment shown, it is assumed that the DC-to-DC converter 35 can be operated with input voltages between 5 and 16V. On the output side, the DC-to-DC converter 35 should be able to provide a voltage between 10 and 16V.

In a charging operation of the voltage stabilization device 30 (row no. 1 in the table of FIG. 2), a voltage is not applied to the consumer 20 ("Output OFF") and the buffer store 40 is charged via the energy store 10 ("Charging Buffer Store"). For this purpose, the switching elements S1 and S5 are conductively ("1") switched, and the switching elements S2, S3 and S4 are blockingly ("0") switched. The voltage U1 depends on the voltage provided from the energy store 10 and can assume voltages between 5 and 16V corresponding to the operating range of the DC-to-DC converter 35, by means of which the buffer store 40 is charged. Because the aim is here to charge the buffer store 40 to the maximum possible capacity, the maximum output voltage U2 is generated by the DC-to-DC converter. U2 and U3 therefore amount to 16V.

The normal operation of the voltage stabilization device 30 is represented in row no. 2 of the table in FIG. 2. In normal operation, the consumer 20 is provided with voltage ("Output ON") from the energy store 10, for which the switching element S3 is to be conductively switched. Due to the direct connection of the consumer 20 with the energy store 10, a minimal power loss is incurred. The operation of the DC-to-DC converter is not necessary for the supply of the consumer 20 ("without operation of the DC-to-DC converter"). The DC-to-DC converter 35 must be operated in preset intervals in connection with a conductive switching ("1") of the switching elements S1 and S5 only for the optional trickle charging of the buffer store 40 ("Buffer Store Trickle Charging"). In normal operation, the switching elements S2 and S4 are always blockingly ("0") switched.

For normal operation, the voltage U1 must be greater than the first limit voltage Ugs1, thus greater than the voltage required for the operation of the consumer 20. The voltage U1 can therefore move in a range between 10 and 16V. For trickle charging, the maximum possible output voltage of the DC-to-DC converter 35 is applied to the buffer store 40, i.e. U2 and U3 amount to 16V.

A "stabilizing normal operation" of the voltage stabilization device 30 is represented in row no. 3 of the table in FIG. 2. In this stabilizing normal operation, the consumer 20 is provided with voltage from the energy store 10 ("Output ON via DC-to-DC converter"), although the voltage U1 has dropped below the voltage required for the operation of the consumer 20, i.e. U1 is less than the first limit voltage Ugs1. The supply of the consumer now takes place via the DC-to-DC converter 35, which is fed from the energy store 10, under the condition that the voltage U1 is greater than the second limit voltage Ugs2, i.e. larger than the minimum input voltage of the DC-to-DC converter 35. U1 must thus lie between 5 and 10V. For this purpose, the switching element S3 is blockingly ("0") switched, in order to separate the direct connection between the consumer 20 and the energy store 10. Likewise, the switching element S2 is blockingly ("0") switched, as no supply from the buffer store 40 is effected. The switching elements S1 and S4 are conductively ("1") switched to enable the supply via the DC-to-DC converter 35.

The voltage U2 provided by the DC-to-DC converter 35 is between 10 and 16V. If it is assumed that prior to entering "stabilizing normal operation," the voltage has not fallen by leaps, but rather gradually under 10V, the voltage U2 can thus be regulated in order to avoid voltage jumps. If a voltage jump is tolerable to the consumer, the voltage can also be regulated at 16V. The voltage U2 can likewise be increased continuously from 10V to 16V in a ramp. A corresponding control is effected by means of the signal S1 by the control unit 34. A trickle charging of the buffer store 40 does not occur in normal operation in this exemplary embodiment, i.e. the switching element S5 is blockingly ("0") switched. The voltage U3 corresponds to the voltage of the buffer store 40, which was previously charged to 16V. In one variant, a trickle charge as described above could also be carried out in the stabilizing normal operation.

A "stabilizing buffer operation" of the voltage stabilization device 30 is represented in row no. 4 of the table in FIG. 2. In this stabilizing buffer operation, the consumer 20 is no longer provided with voltage from the energy store 10, but rather from the buffer store 40 ("Output ON via Buffer Store"), as the voltage U1 has dropped below the voltage required for the operation of the DC-to-DC converter 35, i.e. U1 is less than the second limit voltage Ugs2. U1 is thus less than 5V. The supply to the consumer takes place via the DC-to-DC converter 35, which is fed from the buffer store 40. For this purpose, the switching element S1, S3 and S5 are blockingly ("0") switched, while the switching elements S2 and S4 are conductingly ("1") switched.

The stabilizing buffer operation is possible as long as the voltage U3 of the buffer store 40 is greater than the required minimum voltage for the operation of the DC-to-DC converter 35, i.e. U3 must be greater than the second limit voltage Ugs2 and thus greater than 5V. The voltage U2 provided by the DC-to-DC converter 35 can be between 10 and 16V. As in the preceding normal operation, the voltage U2 can be regulated at 10V in order to avoid voltage jumps. If the consumer 20 was previously operated at 10V and if a voltage jump is tolerable for the consumer 20, the voltage can thus also be regulated at 16V. The voltage U2 can likewise in this case be increased continuously from 10V to 16V in a ramp. A corresponding control is effected by means of the signal S1 by the control unit 34. A trickle charging of the buffer store 40 does not occur in emergency operation in this exemplary embodiment, i.e. the switching element S5 is blockingly ("0") switched.

If the voltage U3 of the buffer store sinks below the second limit voltage Ugs2 due to the ongoing discharge, a safety shutdown is effected, in which the consumer 20 can no longer be provided with voltage (Output OFF, Safety Shutdown"). In this state, shown in row no. 5 of the table in FIG. 2, all of the switching elements S1 to S5 are or will be blockingly ("0") switched. The voltage U2 at the output of the DC-to-DC converter 35 is 0V. The voltage U1 here is still less than the second limit voltage Ugs2 and is between 0 and 5V.

The proposed device 30 thus enables a later start of discharge of the buffer store 40, which allows a longer supply to the consumer 20. Furthermore, the buffer store 40 can be discharged up to a minimum voltage for the operation of the DC-to-DC converter, and thereby significantly more deeply in comparison to the known solutions, which also allows a longer supply of the consumer 20. The buffer store 40 can additionally be charged to a maximum possible voltage, which also brings an increased voltage swing and enables a yet longer supply to the consumer 20. Each measure creates individually as well as in combination a maximization of the buffer capacity of the buffer store 40.

As a result, the consumer operated with this device is optimally stabilized independent from fluctuations or failures of the energy store. There is no loss of power in normal operation. Furthermore, no critical consumer stress states may occur.

LIST OF REFERENCE CHARACTERS

10 Energy store
11 Supply terminal of the energy store 10
20 Consumer
21 Supply input of the consumer 20
30 Device for stabilizing supply to the consumer 20
31 Input of the device 30 (IN)
32 Output of the device 30 (OUT)
33 Input for buffer store 40
34 Control unit
35 DC-to-DC converter
36 Input of the DC-to-DC converter
37 Output of the DC-to-DC converter
38 Supply input for control unit 34
40 Buffer store
S1 First switching element
S2 Second switching element
S3 Third switching element
S4 Fourth switching element
S5 Fifth switching element
U1 Input voltage of the device at input 31
U2 Output voltage of the DC-to-DC converter 35
U3 Voltage of the buffer store 40
Ugs1 First limit voltage
Ugs2 Second limit voltage
m1 Measurement signal representing the input voltage U1 of the device at input 31
m2 Measurement signal representing the output voltage U2 of the DC-to-DC converter
m3 Measurement signal representing the voltage U3 of the buffer store 40
s1 Control signal for the DC-to-DC converter The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for stabilizing a supply to a consumer from a buffer store, wherein during normal operation the consumer is supplied from an energy store, and wherein the device comprises:
 a DC-to-DC converter;
 a plurality of controllable switching elements; and
 a control unit configured to control switching states of the plurality of controllable switching elements based on an input voltage of the device, wherein the device is configured to:
 supply the consumer during normal operation, while bypassing components having power losses, directly from the energy store when the input voltage is greater than a first preset limit voltage, wherein the first preset limit voltage is a minimum voltage of the consumer required for the supply of said consumer;
 supply the consumer via the DC-to-DC converter fed from the energy store when the input voltage is below the first preset limit voltage, wherein the DC-to-DC converter converts the input voltage into an operating voltage of the consumer; and
 feed the DC-to-DC converter from the buffer store when the input voltage sinks below a second preset limit voltage until a voltage of the buffer store reaches the second preset limit voltage, wherein the second preset limit voltage is a minimum voltage for operation of the DC-to-DC converter,
 wherein the energy store is disconnected from the DC-to-DC converter when the buffer store feeds the DC-to-DC converter,
 wherein the plurality of controllable switching elements comprises a first controllable switching element which is interconnected between an input of the DC-to-DC converter and an input of the device, wherein the DC-to-DC converter can be connected with the energy store via the first switching element, whereby the consumer can be supplied by means of the DC-to-DC converter fed by the energy store when the input voltage is below the first preset limit voltage, wherein the plurality of controllable switching elements comprises a second controllable switching element which is interconnected between the input of the DC-to-DC converter and a connection to the buffer store, whereby the consumer can be supplied by means of the DC-to-DC converter fed by the buffer store when the input voltage is below the second preset limit voltage, wherein the first and the second controllable switching elements do not have the same switching state during the normal operation, wherein the normal operation comprises all operating states with an exception of a safety shut-off, in which all of the plurality of controllable switching elements of the device are turned off.

2. The device according to claim 1, wherein the plurality of controllable switching elements comprises a controllable third switching element via which the consumer can be connected directly to the energy store, whereby the consumer can be supplied during the normal operation directly from the energy store, while bypassing the components having power losses.

3. The device according to claim 1, wherein the plurality of controllable switching elements comprises a fourth controllable switching element, which is interconnected between an output of the DC-to-DC converter and an output of the device, whereby the DC-to-DC converter can be connected to the consumer via the fourth switching element.

4. The device according to claim 2, wherein the plurality of controllable switching elements comprises a fourth controllable switching element, which is interconnected between an output of the DC-to-DC converter and an output of the device, whereby the DC-to-DC converter can be connected to the consumer via the fourth switching element.

5. The device according to claim 1, wherein the plurality of controllable switching elements comprises a fifth controllable switching element, which is interconnected between the output of the DC-to-DC converter and the connection to the buffer store, whereby the buffer store can be charged.

6. The device according to claim 3, wherein the plurality of controllable switching elements comprises a fifth controllable switching element, which is interconnected between the output of the DC-to-DC converter and the connection to the buffer store, whereby the buffer store can be charged.

7. The device according to claim 1, wherein the control unit is provided with voltage from the buffer store.

8. The device according to claim 1, wherein the control unit is configured to detect the input voltage, the output voltage of the DC-to-DC converter and the voltage of the buffer store, and based therein, to determine switching states corresponding to the plurality of controllable switching elements.

9. The device according to claim 1, wherein the buffer store is an electrochemical capacitor.

10. The device according to claim 1, wherein the buffer store is a component of the device.

* * * * *